(12) United States Patent
Hyun et al.

(10) Patent No.: US 9,344,495 B2
(45) Date of Patent: May 17, 2016

(54) PEER-TO-PEER NETWORK SYSTEM WITH MANAGEABILITY

(71) Applicant: Electronics and Telecommunications Research Institute, Daejeon (KR)

(72) Inventors: Wook Hyun, Daejeon (KR); Sung Hei Kim, Daejeon (KR); Chang Kyu Lee, Daejeon (KR); Shin Gak Kang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 254 days.

(21) Appl. No.: 13/894,529

(22) Filed: May 15, 2013

(65) Prior Publication Data

US 2014/0019543 A1    Jan. 16, 2014

(30) Foreign Application Priority Data

Jul. 10, 2012 (KR) ........................ 10-2012-0075042

(51) Int. Cl.
*G06F 15/16* (2006.01)
*H04L 29/08* (2006.01)

(52) U.S. Cl.
CPC ............ *H04L 67/104* (2013.01); *H04L 67/101* (2013.01); *H04L 67/1008* (2013.01); *H04L 67/1044* (2013.01); *H04L 67/1046* (2013.01); *H04L 67/1063* (2013.01)

(58) Field of Classification Search
CPC .................................................... H04L 67/104
USPC ......... 709/204, 205, 206, 207, 217, 218, 219, 709/223, 224, 226
See application file for complete search history.

(56) References Cited

U.S. PATENT DOCUMENTS

| | | | |
|---|---|---|---|
| 7,925,592 B1* | 4/2011 | Issa et al. ........................ | 705/59 |
| 8,244,857 B2* | 8/2012 | Jakob et al. .................... | 709/224 |
| 2004/0249888 A1* | 12/2004 | Berkey et al. ................. | 709/204 |
| 2005/0135341 A1* | 6/2005 | Kim .............................. | 370/352 |
| 2006/0206486 A1* | 9/2006 | Strickland ........................ | 707/9 |
| 2007/0038578 A1* | 2/2007 | Liu et al. ........................ | 705/62 |
| 2007/0064702 A1* | 3/2007 | Bates et al. .................... | 370/392 |
| 2009/0265473 A1* | 10/2009 | Hydrie et al. ................. | 709/229 |
| 2011/0055347 A1* | 3/2011 | Hu et al. ........................ | 709/217 |
| 2011/0208823 A1* | 8/2011 | Beigi et al. .................... | 709/206 |
| 2012/0110089 A1* | 5/2012 | Wang et al. .................... | 709/205 |
| 2013/0007186 A1* | 1/2013 | Liu et al. ........................ | 709/213 |

FOREIGN PATENT DOCUMENTS

| | | |
|---|---|---|
| EP | 1821487 B1 | 8/2007 |
| KR | 10-0810759 | 3/2008 |
| KR | 10-2009-0097034 | 9/2009 |
| KR | 10-2010-0060304 | 6/2010 |

* cited by examiner

*Primary Examiner* — Liangche A Wang
*Assistant Examiner* — Kaylee Huang
(74) *Attorney, Agent, or Firm* — Nelson Mullins Riley & Scarborough LLP; Anthony A. Laurentano

(57) ABSTRACT

A peer-to-peer network system provides at least one peer with information for configuration of a peer-to-peer network to optimize the configuration of the peer-to-peer network by using at least one of information about a status of the at least one peer, information about a status of an underlying network and information about a user in respect of services.

3 Claims, 7 Drawing Sheets

PEER-TO-PEER NETWORK SYSTEM WITH MANAGEABILITY

CROSS-REFERENCE TO RELATED APPLICATION

This application claims priority to and the benefit of Korean Patent Application No. 10-2012-0075042, filed Jul. 10, 2012, the disclosure of which is incorporated herein by reference in its entirety.

BACKGROUND

1. Field of the Invention

The present invention relates to a peer-to-peer network system, and more particularly to, a peer-to-peer network system with manageability improving quality of peer-to-peer network-based services and providing a service provider with service management functions.

This research was supported by the Context-Aware Contents Delivery Standardization program of MKE (The Ministry of Knowledge Economy)

2. Discussion of Related Art

A peer-to-peer network in association with content services for providing a plurality of recipients with content refers to a distributed network where a plurality of individual participants called peers do not receive content from a specific server but are directly connected to each other and transmit/receive content with each other. Therefore, a single peer functions as a client receiving content and may function as a server providing content as a need arises. In addition, since a peer-to-peer network is formed using a construction algorithm on the basis of content to be shared rather than a specific server, inter-peer connections may be flexible, and network size may also vary.

In terms of content services, when selecting a peer that sends content, a peer-to-peer network does not consider the status of an underlying physical network and information on peers constituting the peer-to-peer network. Therefore, efficiency in constructing the peer-to-peer network may be reduced, and load may be concentrated on a specific network or a specific peer. In addition, service quality may not be uniform in respect of services, and it may be difficult to prevent illegal distribution of content.

SUMMARY OF THE INVENTION

The present invention is directed to a peer-to-peer network system with manageability collectively considering the status of an underlying network and the status of a peer.

One aspect of the present invention provides peer-to-peer network system with manageability, including: at least one peer, wherein the peer-to-peer network system provides the at least one peer with information for configuration of a peer-to-peer network to optimize the configuration of the peer-to-peer network by using at least one of information about a status of the at least one peer, information about a status of an underlying network and information about a user in respect of services, and the peer-to-peer network system allows a service provider to stably provide service to the at least one peer.

BRIEF DESCRIPTION OF THE DRAWINGS

The above and other features and advantages of the present invention will become more apparent to those of ordinary skill in the art by describing in detail exemplary embodiments thereof with reference to the attached drawings in which.

DETAILED DESCRIPTION OF EMBODIMENTS

Figure 1:
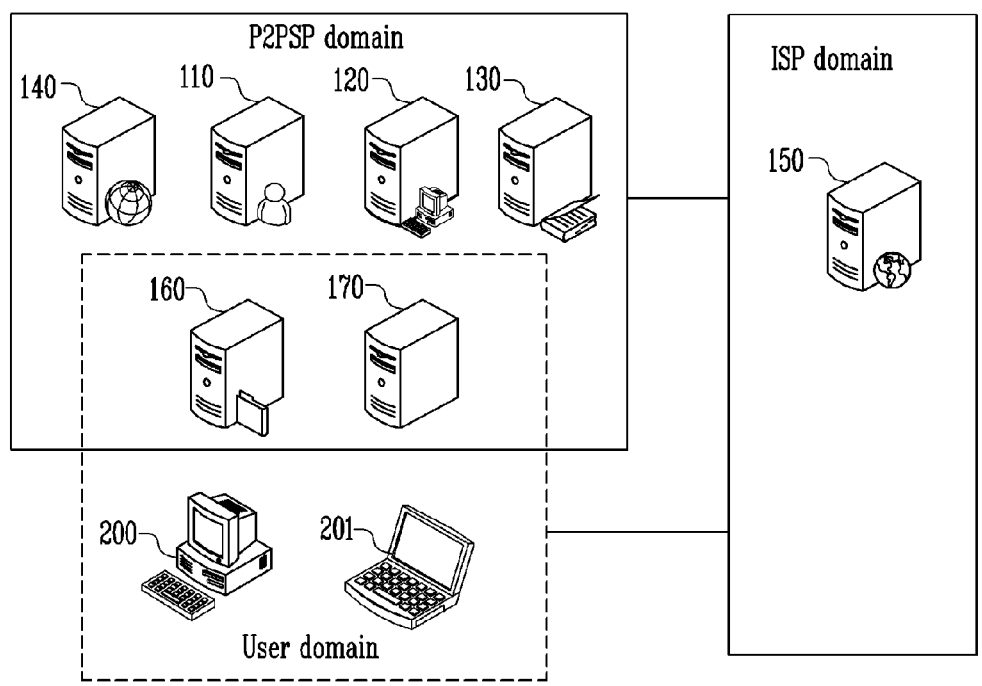
FIG. 1 is a diagram illustrating a system configuration of a peer-to-peer network in a domain view according to an exemplary embodiment of the present invention.

The present invention will be described more fully hereinafter with reference to the accompanying drawings, in which exemplary embodiments of the invention are shown. This invention may, however, be embodied in different forms and should not be construed as limited to the embodiments set forth herein. In drawings, portions unrelated to description will be omitted to distinctly describe the present invention and similar reference numerals are labeled to similar portions throughout the specification.

FIG. 1 is a diagram illustrating a system configuration of a peer-to-peer network in a domain view according to an exemplary embodiment of the present invention. Referring to FIG. 1, a peer-to-peer network system with manageability according to an exemplary embodiment of the present invention may include a peer-to-peer Service Provider (P2PSP) domain, an Internet Service Provider (ISP) domain and a User domain.

The P2PSP domain may control and support managed P2P-based services. The P2PSP domain may control service in cooperation with various servers such as an overlay management server 140, a user profile management server 110, a peer activity management server 120 and an index server 130 to be described below. In addition, the P2PSP domain may support service through a cache server 160 and a relay server 170. In addition, according to the present invention, the P2PSP domain may improve managed P2P-based service in terms of underlying network efficiency in cooperation with an Internet service provider (ISP).

The ISP domain may provide another domain, such as the P2PSP or user domain, with information on the underlying network, such as capacity, policy and network distance. The ISP domain may include a underlying network information server (UNIS) 150 as an entity providing such information.

The user domain is a domain where the managed P2P-based services according to an exemplary embodiment of the present invention are consumed. The user domain may include one or more peers. Peers may receive service from another peer or an entity in the P2PSP domain. In addition, a peer may function as the cache server 160 or the relay server 170 according to network policies or needs.

As illustrated in FIG. 1, since a peer-to-peer network system with manageability according to an exemplary embodiment of the present invention may further include the P2PSP domain and the ISP domain in addition to the user domain consisting of peers, disadvantages of a conventional peer-to-peer network may be overcome, and quality of network service and manageability of a service provider may be more improved. In addition, each domain as illustrated in FIG. 1 may include peers or various servers. A server or a peer exemplified in the specification may be collectively referred to as an entity. Hereinafter, functions of entities and inter-entity interactions according to an exemplary embodiment of the present invention will be described in detail.

Figure 2:
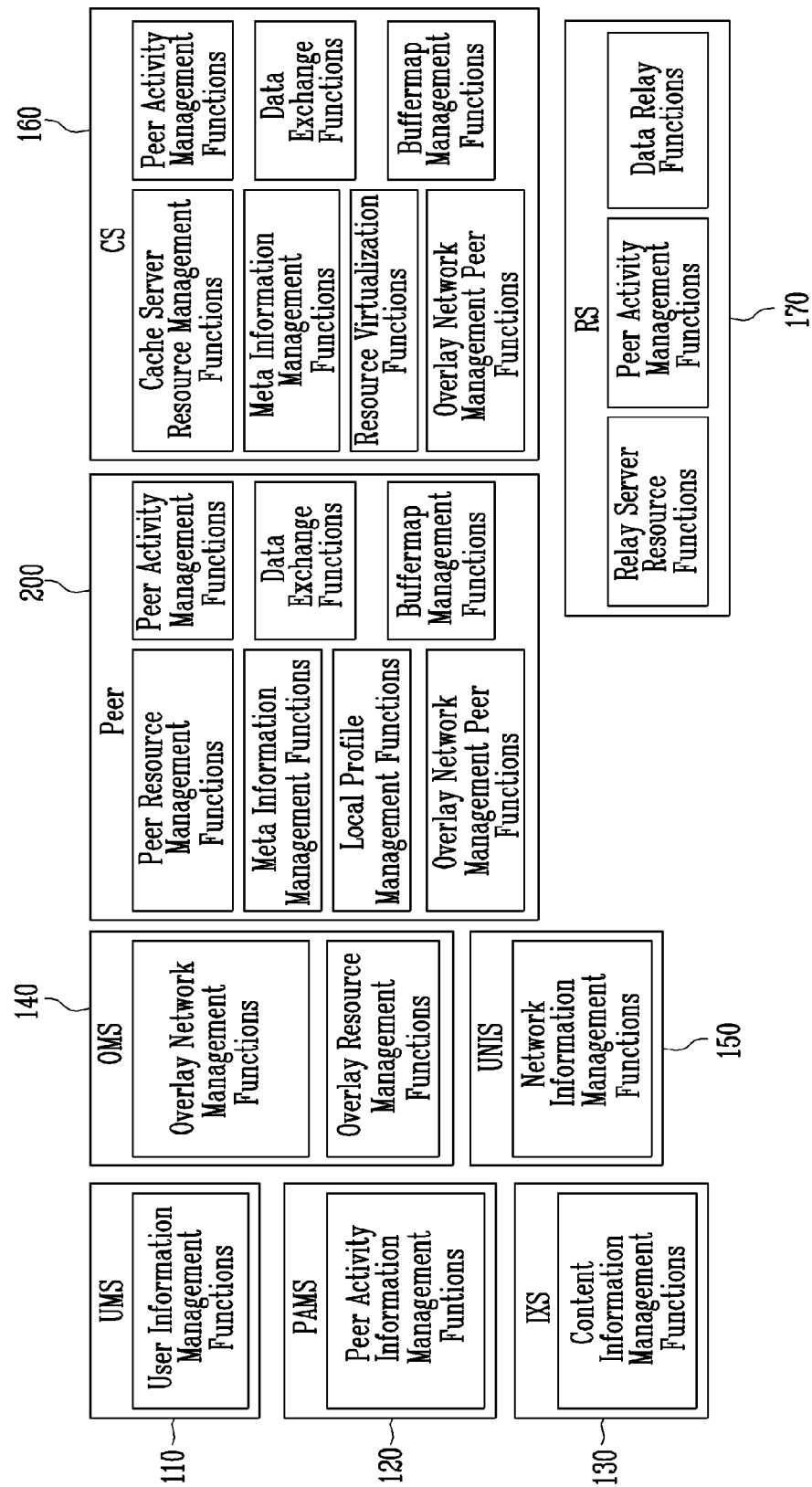
FIG. 2 is a schematic diagram illustrating entities constituting a peer-to-peer network according to an exemplary embodiment of the present invention.

FIG. 2 is a schematic block diagram illustrating entities in a peer-to-peer network system according to an exemplary embodiment of the present invention. Referring to FIG. 2, a peer-to-peer network system according to an exemplary embodiment of the present invention may include at least one peer 200 and a plurality of servers 110, 120, 130, 140, 150, 160 and 170 that join a peer-to-peer network and transmit/receive content. The plurality of servers may include the user profile management server 110, the peer activity management server 120, the index server 130, the overlay management server 140, an underlying network information management server 150, the cache server 160 and the relay server 170 according to functions.

The user profile management server 110 may manage user information such as user name, identification (ID), personal information or service usage status, for functions in service aspects such as charging for service by using information in respect of services to be described below. In addition, the user profile management server 110 may provide the user information to other entities. The user profile management server 110 may create a peer-to-peer user profile in order to manage the user information and may update or provide the peer-to-peer user profile to a requester that needs the peer-to-peer user profile, for example, an overlay management server to be described below. Therefore, a profile for each user may be maintained in the user profile management server 110. User information in a user profile may include user identification (ID), network information and user reputation. In addition, the user profile management server 110 may include user information management functions to perform the corresponding functions.

The peer activity management server 120 may manage information about peers to be described below in order to efficiently construct a peer-to-peer network. The peer activity management server 120 may create, collect or manage status information about the peers, analyze the status information and provide information to the overlay management server 140. Information collected by the peer activity management server 120 may include dynamic status information or static status information about the peers. In addition, the peer activity management server 120 may include peer activity information management functions in order to perform the above-described functions.

The index server 130 may provide and manage meta information about content necessary for a user to receive service. The index server 130 may manage meta information about content and mapping information between the content and an overlay network. The index server 130 may provide a user with necessary meta information and provide a peer, which needs service, with information about the overlay management server 140 that the peer is to connect in order to receive the service. Though the index server 130 may provide only meta information about content, the meta information may include the information about the overlay management server 140 that the peer is to connect. The index server 130 may include content information management functions in order to perform the corresponding functions.

The overlay management server 140 may provide and manage information about the peer-to-peer network so that peers may construct the peer-to-peer network. The overlay management server 140 may generate and manage the information about the peer-to-peer network constructed to provide the content on the basis of the user information in respect of services, status information about an underlying network with respect to the peer-to-peer network, and peer status information. In addition, the overlay management server 140 may manage a list of peers joining each overlay network. When new peers join the corresponding overlay network and request a peer list, the overlay management server 140 may interwork with the peer activity management server 120 and the network information management server 150 to create and transmit an optimal peer list to the peers. The overlay management server 140 may include overlay network management functions that manage the overlay network and overlay resource management functions that manage resources in the overlay network, and track and maintain status information.

The network information management server 150 may manage the information about the underlying network in order to construct the peer-to-peer network that reflects the information about the underlying network and may provide another entity with the information. The network information management server 150 is present in the ISP domain and may perform exclusive functions for providing the information about the underlying network and information about network management policies to a peer or a server in another domain such as the P2PSP domain or the user domain. The network information management server 150 may provide network distance information between the peers in the peer-to-peer network. The network information management server 150 may interact with the peers or the overlay management server 140. More specifically, the network information management server 150 may include network information management functions in order to perform the corresponding functions. The network information management functions may interact with the overlay management server 140 in order to provide the information about the underlying network to the overlay management server 140. The information about the underlying network may be selectively provided to the peers.

The cache server 160 may download or distribute content in place of a peer that does not have sufficient resources or is lack of resources. In other words, the cache server 160 may temporarily cache (or store) content in place of a peer in order to stably provide P2P-based services. The cache server 160 may include an exclusive server provided by the P2PSP in order to perform the corresponding functions. Alternatively, a peer that provides content may voluntarily serve as a temporary device that offers the corresponding functions. When the cache server 160 includes an exclusive cache server, the exclusive server is generally a trusted device that is controlled by the P2PSP. Therefore, when a trouble occurs, the cache server 160 is required to report the trouble to the overlay management server 140. When the cache server 160 includes a temporary cache device, the temporary cache device is generally a user device that has less responsibility than the exclusive cache server. Therefore, when a trouble occurs, the cache server 160 is recommended to report the trouble to the overlay management server 140.

The cache server 160 may be functions configured to perform the corresponding function. The cache server 160 may include cache server resource management functions, meta information management functions, resource virtualization functions, overlay network management peer functions and peer activity management functions. The above-described functions may manage inter-peer connections, registration of a particular service and activity information to be reported.

In addition, the cache server 160 may include data exchange functions and buffermap management functions as data management functions configured to perform the corresponding function. The data management functions may manage data exchange between a local buffer and another peer (or cache server or relay server).

The relay server 170 may relay content in order to help a peer, which did not participate in the peer-to-peer network due to a firewall according to the status of the network, join the network. For example, the relay server 170 may help a specific peer stably access the network by maintaining connections to the corresponding peer present behind a NAT/firewall. Therefore, the relay server 170 may not actively participate in the peer-to-peer overlay network but improve a network connection rate and connection quality of a peer. The relay server 170 may be comprised of an exclusive server provided by the P2PSP in order to perform the corresponding functions, or a temporary device to which a peer providing content voluntarily provides the corresponding functions. When the relay server 170 is comprised of an exclusive server, the relay server 170 is generally a trusted device that is controlled by the P2PSP. Therefore, when a trouble occurs, the relay server 170 is required to report the trouble to the overlay management server 140. When the relay server 170 is comprised of a temporary relay device, the relay server 170 is a user device that has less responsibility than the exclusive relay server. Therefore, when a trouble occurs, the relay server 170 is recommended to report the trouble to the overlay management server 140.

The relay server 170 may include relay server resource management functions and peer activity management functions as functions configured to perform the corresponding function. The functions may manage inter-peer connections, registration of specific service, relay information and activity status to be reported as activity information.

In addition, the relay server 170 may include data relay functions as data management functions configured to perform the corresponding function. The data management functions may manage data exchange between a local buffer and another peer (or cache server or relay server).

Figure 3:
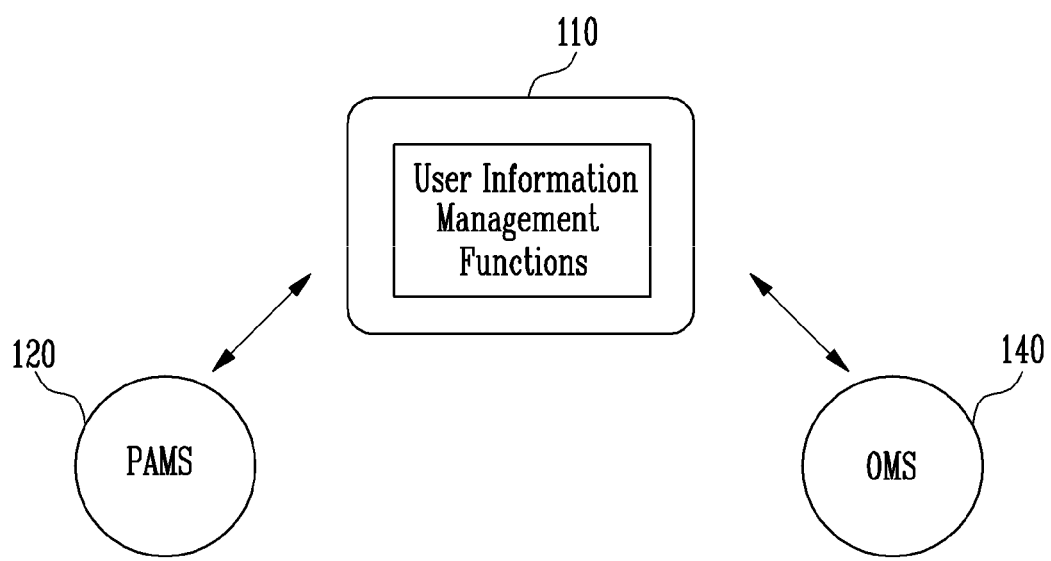
FIG. 3 is a diagram illustrating interoperation relationships between a user profile management server and related entities in a peer-to-peer network system according to an exemplary embodiment of the present invention.

FIG. 3 is a diagram illustrating interoperation relationships between a user profile management server and related entities in a peer-to-peer network system according to an exemplary embodiment of the present invention. Referring to FIG. 3, the user profile management server 110 may include user information management functions configured to manage user profile information.

The user information management functions may manage and control profile information about a user and information relevant to user's activity and provide user information in respects of service to the overlay management server 140.

When the user information management functions manage the profile information about the user, the user information management functions may manage data in a non-automatic manner. For example, the user information management functions may perform operations such as creating and deleting a user's ID and changing information, in a user-driven manner.

The user profile information may, for example, user priority, user preference, user state, contribution status and service usage.

While the user information management functions maintain and manage the user profile information as information for a user profile, if the user profile information is determined as peer profile information, the user information management functions may change the corresponding information to the peer profile information and maintain the peer profile information. The peer profile information may include network locations, connection types of a peer, a communication method, such as ADSL, Cable, or FTTH, and a type of a device forming a peer. The peer profile information maintained by the user information management functions may be transmitted to the peer activity management server 120 and managed by the peer activity management server 120.

Information relevant to user activity may include information about a record of user's service usage or information about a record of user's providing service. The information relevant to the user activity may be received from the peer activity management server 120 and utilized as incentives for the user.

As illustrated in FIG. 3, the user profile management server 110 may communicate with the overlay management server 140 to generate user profile information and may communicate with the peer activity management server 120 to obtain activity information about a specific peer. In addition, when there is a request from an external entity, the user profile management server 110 may provide and update information relevant to user activity or the user profile information being managed.

In other words, the peer-to-peer network system according to an exemplary embodiment of the present invention may add manageability using user information in respect of services on the basis of information managed and provided by the user profile management server 110, thereby ensuring network reliability and providing service stability and differentiation.

Figure 4:
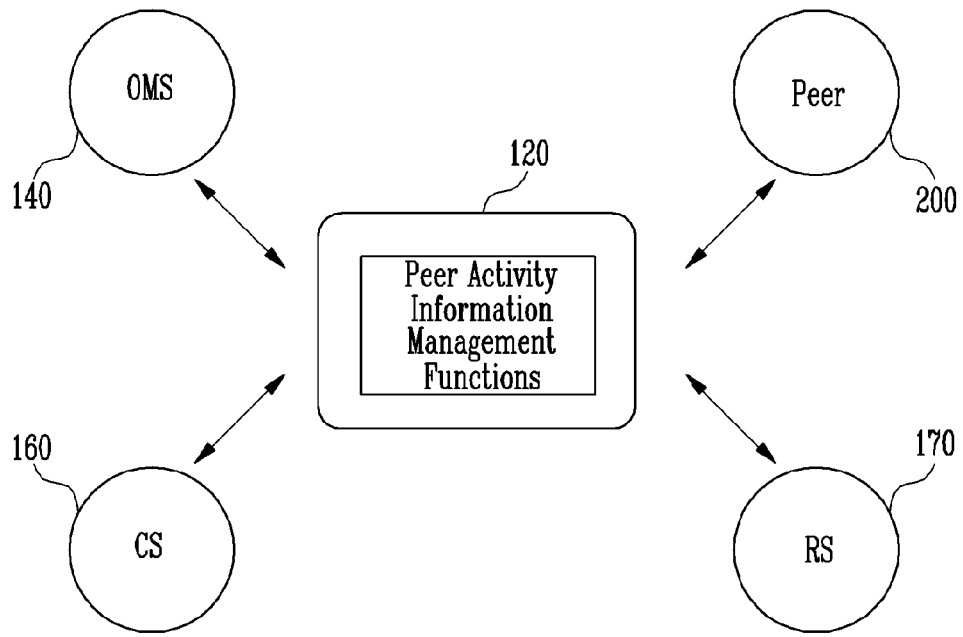
FIG. 4 is a diagram illustrating interoperation relationships between a peer activity management server and related entities in a peer-to-peer network system according to an exemplary embodiment of the present invention.

FIG. 4 is a diagram illustrating interoperation relationships between a peer activity management server 120 and related entities in a peer-to-peer network system according to an exemplary embodiment of the present invention. Referring to FIG. 3, the peer activity management server 120 may include peer activity information management functions and manage peer activity information. The peer activity management server 120 may receive information from peers, create and manage peer status information on the basis of the information, and transmit the peer status information at the request of another server or peer.

The peer status information managed by the peer activity management server 120 may include dynamic status information related to peer activity status and static status information including peer profile information such as network construction and network service policies. The peer activity status information may be collected from peers, and the collected information may be analyzed, processed and stored.

The peer activity information managed by the peer activity management server 120 may include peer dynamic status information. Since the peer dynamic status information varies over time, the peer dynamic status information may be deleted or changed and maintained according to a predetermined cycle, at a predetermined event, or according to predetermined conditions such as network service policies.

The peer dynamic status information may include physical network status information, overlay network status information and system status information.

The physical network status information may include incoming bandwidth and outgoing bandwidth and refer to snapshot information about the current physical network status of a peer.

The overlay network status information may be snapshot information about peer's current overlay network, which may include information about connected peers, the amount of data transmitted to a specific peer and the amount of data received.

The system status information may be peer's current physical system status information, which may include system load and storage status.

The dynamic status information may be reported by peers and collected. Since the dynamic status information is periodically or aperiodically transmitted, the dynamic status information may not be dominated at all. The peer activity management server 120 may not directly request a peer for corresponding information but may be operated in such manual mode that the peer activity management server 120 may collect and manage only the information transmitted from the peer.

Status information that the peer periodically reports to the peer activity management server 120 may include, for example, information about the amount of data the peer received from other peers, the amount of data transmitted, and an operation history such as a data transmission/reception history. Information that the peer aperiodically reports to the peer activity management server 120 is about a predetermined event when the predetermined event occurs. For example, the information may include an error report that is immediately sent if a trouble occurs when the peer accesses another peer.

In addition, the peer activity management server 120 may manage the peer profile information. The peer profile information may refer to information that is set in an application in order for each peer to operate as a peer in the peer-to-peer network. For example, the peer profile information may include information such as limiting a maximum upload capacity to x Mbps or limiting a maximum download capacity to y Mbps and setting a maximum number of peer connections to n. Since the peer profile information is based on initial setup of the peer, the peer profile information may be referred to as static status information. However, the setup may be changed. The peer profile information may also be subject to change according to changes in network policies or n network status.

The peer profile information may be classified into information about a P2P behavior policy. The P2P behavior policy may be classified into a maximum number of peer connections, a maximum number of peer connections per overlay network, a maximum upload capacity and a maximum download capacity.

As access information of the peer activity management server 120 used when each peer provides its profile information to the peer activity management server 120, for example, address information, the peer static status information may be requested and received from the overlay management server 140 when each peer joins an overlay network.

The peer static status information may be voluntarily provided by the peer and may be used as peer incentives. In addition, the peer activity management server 120 may be operated in such manual mode that the peer activity management server 120 may not directly request the peer for the corresponding information, and collect and manage only the information transmitted from the peer.

In addition, the peer activity management server 120 may analyze and process dynamic status information and static status information collected from peers. The analyzed peer activity information may be divided into dynamic status information or static status information according to type, and may be maintained.

When the peer activity management server 120 needs to transmit the peer activity information to the overlay management server 140, the peer activity management server 120 may extract and analyze necessary information, process the information in a format suitable for transmission and transmit the information to the overlay management server 140.

The overlay management server 140 may update overlay network status information in order to keep the status of the overlay network, managed by the overlay management server 140, up to date. More specifically, the overlay management server 140 may request the peer activity management server 120 for status information about peers joining the overlay network. The requested information may be status information about all of the peers or status information about some of the peers. The peer activity management server 120 may respond to the request on the basis of the information that the activity management server 120 has. Information may be transmitted from the peer activity management server 120 to the overlay management server 140 at the request of the overlay management server 140 and by notification from the peer activity management server 120. Upon request from the overlay management server 140, interfaces of the overlay management server 140 and the peer activity management server 120 may be used. By notification from the peer activity management server 120, a channel is to be established between the overlay management server 140 and the peer activity management server 120 in order to transmit the notification. Therefore, subscription between both servers 120 and 140 may precede. More specifically, subscription may be performed by the interfaces of both servers 120 and 140. Information transmitted/received during a subscription process may be analyzed and processed by the peer activity management server 120.

As illustrated in FIG. 4, the peer activity management server 120 may analyze and process information collected from the peer 200 and maintain the information as peer activity information. At the request of the overlay management server 140, the activity management server 120 may provide the peer activity information. When the user profile management server 110 requests activity information about the peer, the activity management server 120 may provide the requested activity information.

Figure 5:
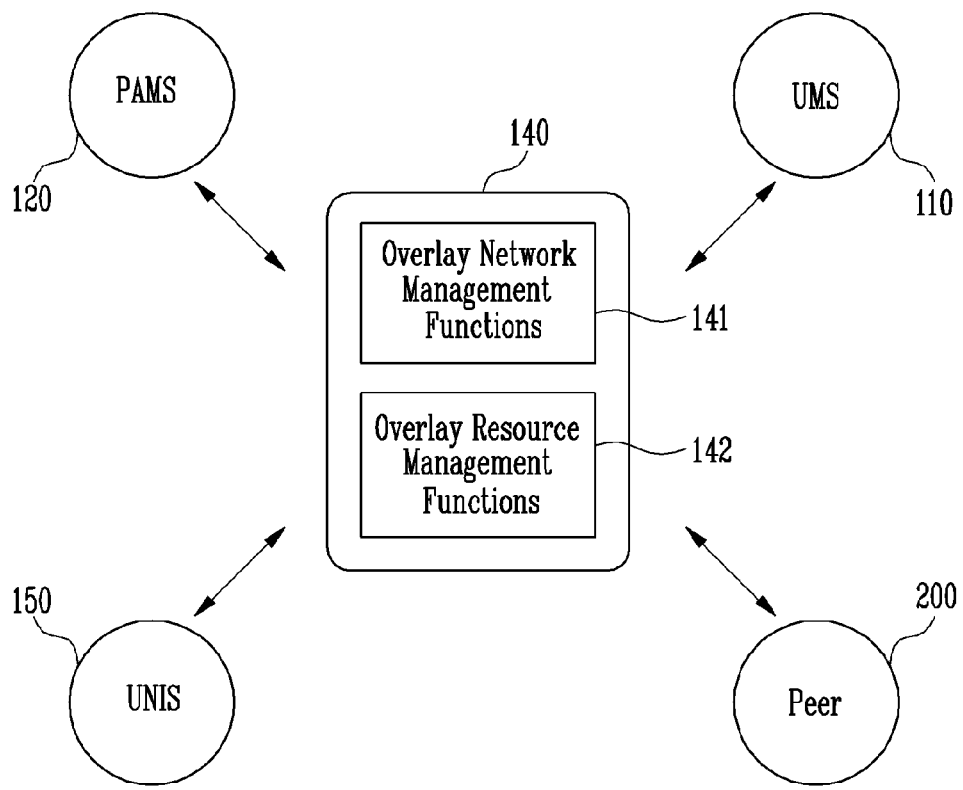
FIG. 5 is a diagram illustrating interoperating relationships between an overlay management server and related entities in a peer-to-peer network system according to an exemplary embodiment of the present invention.

FIG. 5 is a diagram illustrating interoperating relationships between an overlay management server and related entities in a peer-to-peer network system according to an exemplary embodiment of the present invention. Referring to FIG. 5, the overlay management server 140 may include overlay management functions 141 that manage an overlay network and overlay resource management functions 142 that manage resources in the overlay network, and track and maintain status information.

The overlay network management functions 141 may manage overlay information in order to manage the overlay network and manage information to construct the peer-to-peer network, for example, a list of peers in order to optimally construct the overlay network in the peer-to-peer network. In addition, the overlay network management functions 141 may provide the information to construct the peer-to-peer network to another entity in the peer-to-peer network system.

The overlay network management functions 141 may maintain the information about the plurality of overlay networks and the peer information about the peers joining each of the overlay networks in order to manage the plurality of overlay networks. The network management functions 141 may be generally formed in a database format. The information about an overlay network that the overlay network management functions 141 maintain may be about characteristics of each overlay network, such as an overlay network ID, a seeder, a leecher, a relay server, a cache server and effective time. The overlay network management functions 141 may maintain information about peers joining each corresponding overlay network, such as IP, port and peer ID.

The overlay network management functions 141 may process a request from a peer, such as joining or leaving an overlay network. For example, when a peer sends a request to join an overlay network to the overlay management server 140, the overlay network management functions 141 may request the user profile management server 110 for necessary information to check whether or not the peer sending the request is qualified to join the corresponding overlay network.

The overlay network management functions 141 may manage a peer list as information to optimally construct a network. For example, when a specific peer requests a peer list of peers in an overlay network, the overlay network management functions 141 may create and provide an optimal peer list in consideration of the network the peer joins and statuses of other peers. When creating the peer list, the overlay network management functions 141 may receive the information about the underlying network from the network information management server 150 and receive the peer activity information from the peer activity management server 120.

The overlay network management functions 141 may receive the information about the peer activity from the peer activity management server 120. Here, an authentication procedure may precede between the overlay management server 140 and the peer activity management server 120 in order to ensure a security channel.

The overlay network management functions 141 may communicate with the network information management server 150 and transmit the information about a request peer and the peer list of the peers in the overlay network to the network information management server 150 in order to receive the information about the underlying network. The network information management server 150 may arrange the peers in the peer list by using cost information between the request peer and the peers in the peer list and transmit the arranged peer list to the overlay management server 140.

The overlay network management functions 141 may interwork with the peer and process a response to a peer's request such as joining or leaving from a network. At this time, the overlay management server 140 may transmit information about the cache server 160 and the relay server 170 and the peer activity management server 120 related to the overlay network.

The overlay resource management functions 142 may manage resource information related to construction of a peer-to-peer network, that is, resource information of the cache server 160 and the relay server 170 managed by the P2PSP. More specifically, the overlay resource management functions 142 may maintain information about to which overlay network each resource is allocated to or how each resource is utilized in order to maintain resource usage status information according to the cache server 160 and the relay server 170.

A user may request the overlay management server 140 for resources of the cache server 160 and the relay server 170. More specifically, the user may request these resources when a content owner constructs an overlay network in order to distribute content, when a service provider constructs an overlay network, or when a general user requests the cache server 160 to receive content for the general user. Since the overlay management server 140 carries out overall control of resources, a general peer may not access the resources of the cache server 160 and the relay server 170.

The resources of the cache server 160 and the relay server 170 may be directly operated by the P2PSP. However, when a general peer serves as the cache server 160 or the relay server 170, corresponding resources may be provided from the general peer. In the latter case, when a peer accesses the overlay management server 140, the peer may designate and register its operation mode.

The overlay resource management functions 142 may manage overlay resource information. More specifically, the overlay resource management functions 142 may manage information related to the resources of the cache server 160 and the relay server 170 managed by the overlay management server 140. For example, the overlay resource management functions 142 may maintain information about available resource status and usage status of the cache server 160 and the relay server 170.

The overlay resource management functions 142 may control overlay resource information. For example, the overlay resource management functions 142 may reserve the corresponding resources with respect to the cache server 160 and the relay server 170. In this case, the overlay resource management functions 142 may control the cache server 160 so that the cache server 160 may join a specific overlay network to provide service and may designate allocated resources of the cache server 160. Attributes of the allocated resource of the cache server 160 may include uplink bandwidth, downlink bandwidth and the maximum number of concurrent users. Since the cache server 160 operates as a virtual peer, the cache server 160 may be expressed as a subset of a peer configuration.

The overlay resource management functions 142 may control the relay server 170 so that the relay server 170 may join a specific overlay network to provide service and may designate allocated resources of the relay server 170. Attributes of the allocated resources of the relay server 170 may include uplink bandwidth, downlink bandwidth, the maximum number of concurrent users and allocated overlay network information. Since the relay server 170 does not store data but receives and transfers the data, the relay server 170 does not operate as a virtual peer unlike the cache server 160.

In FIG. 5, the cache server 160 and the relay server 170 are not illustrated as entities interworking with the overlay management server 140. However, the cache server 160 and the relay server 170 may interwork with the cache server 160 and the relay server 170 in order to control and manage resources.

Figure 6:
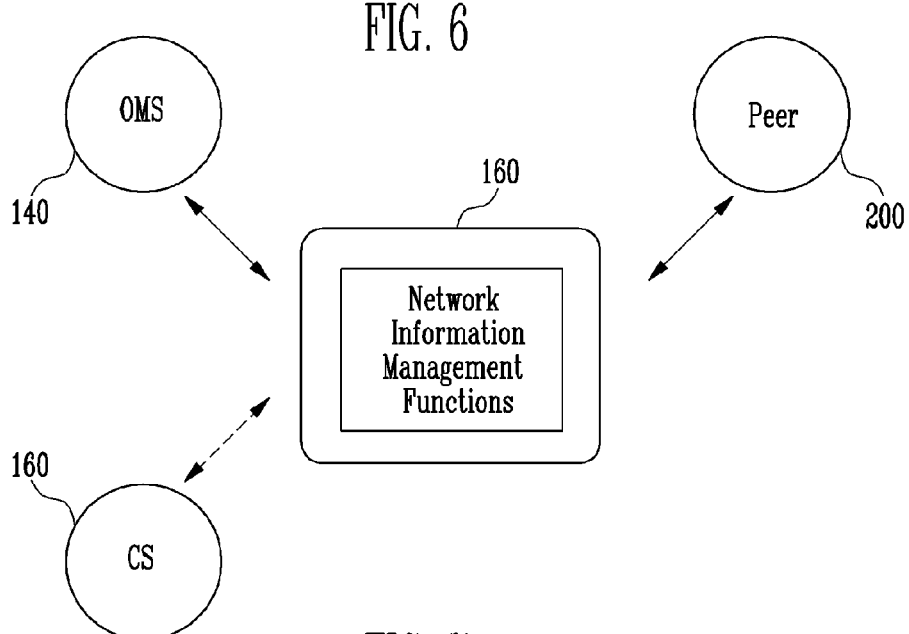
FIG. 6 is a diagram illustrating interoperation relationships between a network information management server and related entities in a peer-to-peer network system according to an exemplary embodiment of the present invention.

FIG. 6 is a diagram illustrating interoperation relationships between the network information management server 150 and related entities in a peer-to-peer network system according to an exemplary embodiment of the present invention. Referring to FIG. 6, the underlying network information server 150 may include network information management functions. The underlying network information server 150 may manage information about a network that the underlying network information server 150 belongs to, control the network according to a policy, calculate a distance between peers forming the network and provide the information about the network and information about the distance between the peers at the request of an external entity.

The network information management server 150 may increase traffic locality and affect the ISP when the ISP selects a peer. The underlying network information server 150 and the overlay network management server 140 may interwork with each other to provide an optimal peer list by a method in which the network information management server 150 optimizes a peer list of peers not arranged and transmits the peer list to the overlay management server 140 or by a method in which the overlay management server 140 optimizes a peer list when the network information management server 150 calculates the distance between the peers according to a predetermined equation and transfers the distance.

When calculating the distance between peers, the network information management server 150 may provide the distance between the peers by using network status or policy when there is a request from the overlay management server 140 or another peer 200. When a peer functions as the cache server 160, the network information management server 150 may interoperate with the cache server 160.

Figure 7:
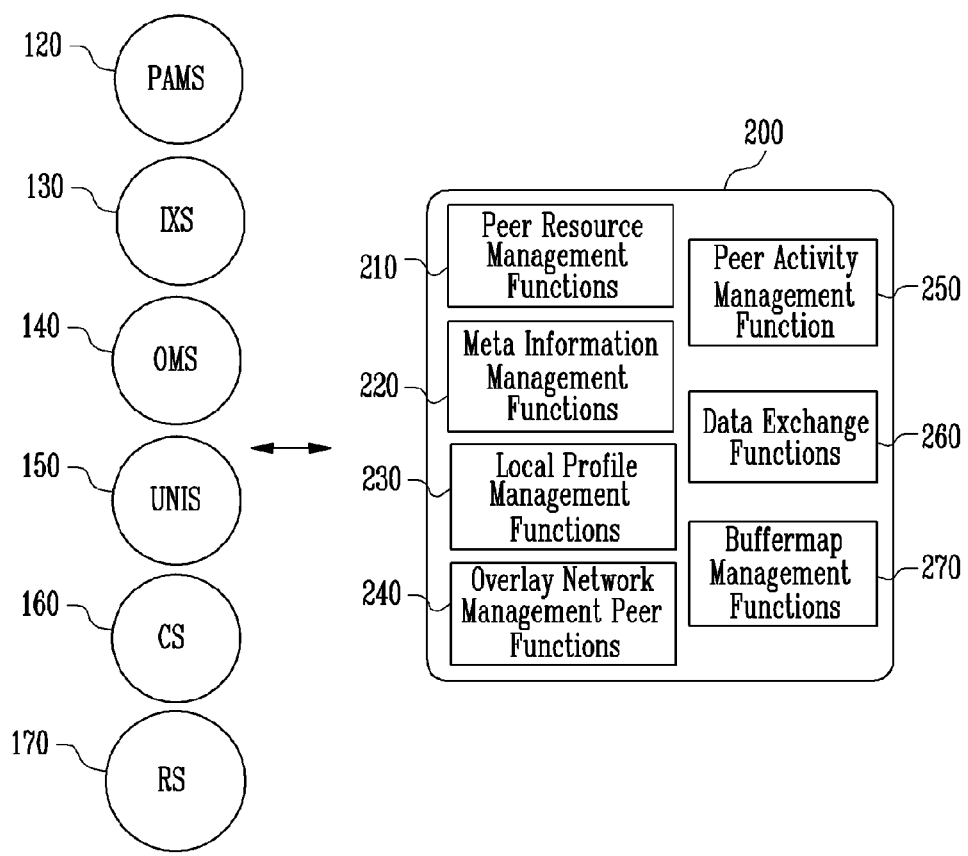
FIG. 7 is a diagram illustrating operation relationships between a peer and related entities in a peer-to-peer network according to an exemplary embodiment of the present invention.

FIG. 7 is a diagram illustrating operation relationships between a peer and related entities in a peer-to-peer network according to an exemplary embodiment of the present invention. Referring to FIG. 7, the peer 200 may include such functions as peer resource management functions 210, meta information management functions 220, local profile management functions 230, overlay network management peer functions 240 and peer activity management functions 250 as functions. In addition, the peer 200 may include data exchange functions 260 and buffermap management functions 270 as data functions.

The peer resource management functions 210 may manage available resources of the peer 200. Resources may include physical storage, network resource or content to be distributed through the peer-to-peer network. The peer resource management functions 210 may manage information about resources such as storage, a network and content in order to perform a function for managing the resources of the peer 200. The information about each of the resources may include policies for resource utilization and statistics information such as resource usage. The information managed by the peer resource management functions 210 may be referenced when there is a request from another entity. In this case, the peer resource management functions 210 may check available resources thereof and determine whether or not to share the resources.

The meta information management 220 may manage meta information of content for a network to share or transmit/receive the content.

The meta information management functions 220 may register the meta information in the index server 130 or receive the meta information from the index server 130 in order to manage the meta information. The meta information may include detailed information about the content, information about files forming the content and information about file fragments. The information about the file fragments included in the meta information may include hash values used to check integrity to size of files. The information about the file fragments may be used to verify the integrity of the file fragments in the peer 200. The information about the content received in a fragment unit by the peer 200 may be recombined and reproduced in the peer 200.

In addition, meta information may include meta information about an overlay network. The meta information may also include address information of the overlay management server 140 for storing overlay network information about the corresponding content therein and an overlay network ID for differentiating the overlay network. The overlay network ID may be a hash value of content information.

The meta information management functions 220 may further manage the meta information about the overlay network in order to manage resources through the entire overlay network in addition to the meta information of the content according to an exemplary embodiment.

The meta information management functions 220 may perform a communication function with the index server 130. More specifically, through communication with the index server 130, a peer may allow the meta information generated by the meta information management functions 220 to be registered in the index server 130 and may receive the meta information from the index server 130 and transmit the meta information to the meta information management functions 220.

Local profile management functions may set and manage a user profile and a peer profile.

The user profile may include a user's ID, password and email address.

The local profile management functions 230 may set and manage a peer profile to function as a peer in an overlay network. The peer profile may vary depending on types of service and include an upload bandwidth policy, a download bandwidth policy and a maximum concurrently supportable peer number. The set information may be transmitted to the peer activity management server 120.

The overlay network management peer functions 240 may manage information about an overlay network in which a peer is joining and information about peers that the overlay network management peer functions 240 come to know.

The network management peer functions 240 may manage information about other peers in overlay networks that the peer is joining, more specifically, information about overlay management servers having overlay network ID and information about the overlay networks. The information about an overlay network may be received from the overlay management server 140.

In addition, the overlay network management peer functions 240 may manage the information about other peers in the overlay network the network management peer functions 240 are joining. The information about other peers may be received from the overlay management server 140 or other peers. Unlike peer information received from other peers, peer information received from the overlay management server 140 may be optimized by interworking between the overlay management server 140 and the network information management server 150. The above-described two types of information may be separately managed.

The network management peer functions 240 may communicate with the network information management server 150 in order to update peer information. Peer information managed by the network management peer functions 240 may be used for communication between peers, be separately managed depending on each overlay network and include peer ID, IP address, port number and cost information between two peers.

The peer activity management functions 250 may be a functional entity to interwork with other functional entities in a peer-to-peer network. The peer activity management functions 250 may perform communication with other entities to allow a peer to join and leave an overlay network, reserve resources, report peer status and interworking between peers.

The peer activity management functions 250 may process a message from a counterpart peer. For example, when there is a connection request from another peer, the peer activity management functions 250 may determine whether or not to grant the connection request with reference to resource status information in the peer resource management functions 210 and may make a response to the connection request according to a result of the determination. In another example, when a request from a counterpart peer includes information about other peers, the peer activity management functions 250 may transmit the information about other peers to the network management peer functions 240. When buffermap information is received from the counterpart peer, the corresponding buffermap information may be transmitted to the buffermap management functions 270 so that the buffermap management functions 270 may manage the buffermap information.

In addition, when the peer activity management functions 250 receives a fragment transmission request from a peer communication client functional entity of another peer, the peer activity management functions 250 may interwork with the buffermap management functions 270 to check a status in which the peer activity management functions 250 has a fragment and may request the data exchange functions 260 to transmit the corresponding fragment if no error is found.

In addition, the peer activity management functions 250 may be in charge of communications between peers by using a peer protocol. At this time, the peer activity management functions 250 may exchange a buffermap for data exchange and information about other peers knowing each other by exchanging a message between peers.

In addition, when peers exchange other resources in addition to content, the peer activity management functions 250 may exchange data for sharing resources and exchange another information about peers the peer activity management functions 250 know. The received peer information may be transmitted to the network management peer functions 240.

In addition, when transmitting a message to another peer, the peer activity management functions 250 may obtain information about the corresponding peer through the network management peer functions 240. In addition, when the peer activity management functions 250 transfer buffermap information thereof to another peer, the activity management functions 250 may receive buffermap information from the buffermap management functions 270.

In addition, when there is a fragment request of data from another peer, the peer activity management functions 250 may interwork with the buffermap management functions 270, extract fragment information, which the peer activity management functions 250 need, and request a peer having the corresponding fragment.

The peer activity management functions 250 may communicate with the overlay management server 140, among other entities, and control the operation of a peer joining the overlay network. More specifically, the peer activity management functions 250 may control peer operations, such as joining and leaving the overlay network, and control the overlay network, such as pausing and resuming a peer, in respect of services.

In addition, the peer activity management functions 250 may join a corresponding overlay network on the basis of overlay network information received from the meta information management functions 220. In addition, the peer activity management functions 250 may transmit information about the corresponding overlay network to the overlay network management peer functions 240 in order to manage the information about the overlay network after joining the overlay network. In addition, the peer activity management functions 250 may transmit the peer list received from the overlay management server 140 to the overlay network management peer functions 240.

The peer activity management functions 250 may interwork with the peer activity management server 120 and perform a function for reporting peer information related to peer activity and status to the peer activity management server 120. The peer information may be reported at the request of the peer activity management server 120, or by a peer either periodically or when an event occurs. In the latter case, a reporting period and an event may be set on the basis of policies of a service provider managing P2PSP. Information about the polices of the service provider may be obtained from the overlay management server 140 when the peer joins the overlay network.

The data exchange functions 260 may be configured to exchange data between peers. The data exchange functions 260 may transmit and receive data and restore received content.

First, the data exchange functions 260 may transmit a data fragment of content to another peer. The data exchange functions 260 may receive fragment information to be transmitted and information of a peer to be received from the peer activity management functions 250 and may transmit the corresponding fragment to the peer. In addition, after transmitting data, the data exchange functions 260 may periodically report transmission information to the peer activity management server 120. When the peer transmits another information in addition to content, for example, information about the overlay network and information about other resources, the data exchange functions 260 may transmit corresponding data to another peer.

In addition, the data exchange functions 260 may receive a data fragment of content from another peer. At this time, the data exchange functions 260 may check integrity of the received data fragment. To this end, hash information of the fragment may be obtained from the meta information management functions 220. A detailed description thereof is omitted since it has been described in association with the meta information management functions 220. When the data exchange functions 260 receives the fragment of the data, the data exchange functions 260 may transmit the fragment information to the buffermap management functions 270.

In addition, the data exchange functions 260 may combine the received fragments of the data received by the peer and restore these fragments into original content. To this end, the data exchange functions 260 may receive meta information about the content from the meta information management functions 220. When the data are completely restored, the data exchange functions 260 may report a result to the cache server 160.

The buffermap management functions 270 may perform operations related to buffermap management in order to exchange fragments between peers in order to perform a function for a content delivery application.

First, the buffermap management functions 270 may perform management such as generating and updating buffermap information of a peer. More specifically, buffermap information in an entity may be updated in such a manner that whenever the peer receives fragments of data, this is reported to the buffermap management functions 270.

In addition, when buffermap exchange is needed between peers, the peer activity management functions 250 may request the buffermap information from the buffermap management functions 270, and the buffermap information may be accordingly transmitted to other peers. When receiving a fragment request from another peer, the peer activity management functions 250 may check a status in which the buffermap management functions 270 have a corresponding fragment and may transmit the corresponding fragment through the data exchange functions 260 if no error is found.

In addition, when receiving buffermap information from another peer, the buffermap management functions 270 may manage and update the buffermap information. The buffermap information being managed may include ID of each peer and buffermap information received from the corresponding peer.

In addition, at the request of the peer activity management functions 250, the buffermap management functions 270 may compare local buffermap information with buffermap information of other peers. More specifically, in order to receive a data fragment, the peer activity management functions 250 may request the buffermap management functions 270 to compare local buffermap information thereof with the buffermap information of other peers, extract an index number of a fragment that the peer activity management functions 250 need, and transmit the index number of the fragment to the peer activity management functions 250. The peer activity management functions 250 may request the corresponding fragment from a peer that has the corresponding fragment on the basis of this information.

Figure 8:
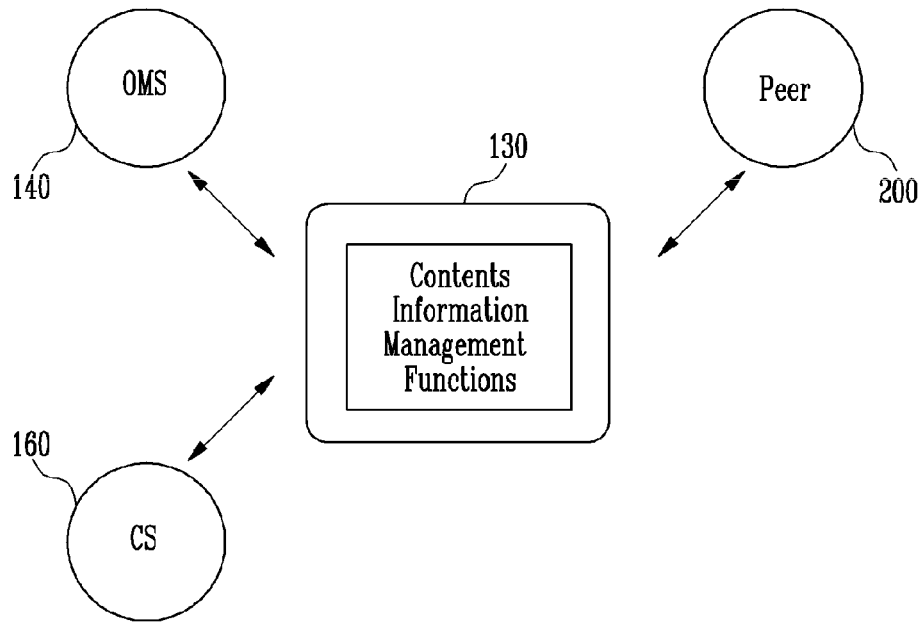
FIG. 8 is a diagram illustrating interoperation between an index server and related entities in a peer-to-peer network system according to an exemplary embodiment of the present invention.

FIG. 8 is a diagram illustrating interoperation relationships between an index server and related entities in a peer-to-peer network system according to an exemplary embodiment of the present invention. Referring to FIG. 8, the index server 130 may include content information management functions.

When the content information management functions manage meta information of content, a content provider or a service provider may generate the meta information and register the meta information in the index server 130. When registering the meta information, the content provider may input service level information about the content, for example, content type and name in addition to the meta information. More specifically, the content provider may generate meta information of content and enter an address of the overlay management server 140, which will manage an overlay network, into the meta information. The meta information generated by the content provider may include a hash value generated by using a hash function based on contents of the meta information. This hash value may be used as an overlay ID for differentiating an overlay network with respect to the corresponding content. The content provider may be a peer or a cache server. Subsequently, the content provider may be connected to an overlay management server to generate an overlay network and join the overlay network.

The content information management functions may store, maintain and retrieve meta information of content. Peers may obtain meta information about desired content by searching service level content information, for example, name of content. When the cache server 160 operates as a peer, the cache server 160 may also obtain information about content in the same manner as a peer does. When meta information of content is registered, a time-out value may be set by the content provider. The meta information of the content may be deleted after a period of time corresponding to the time-out value.

Figure 9:
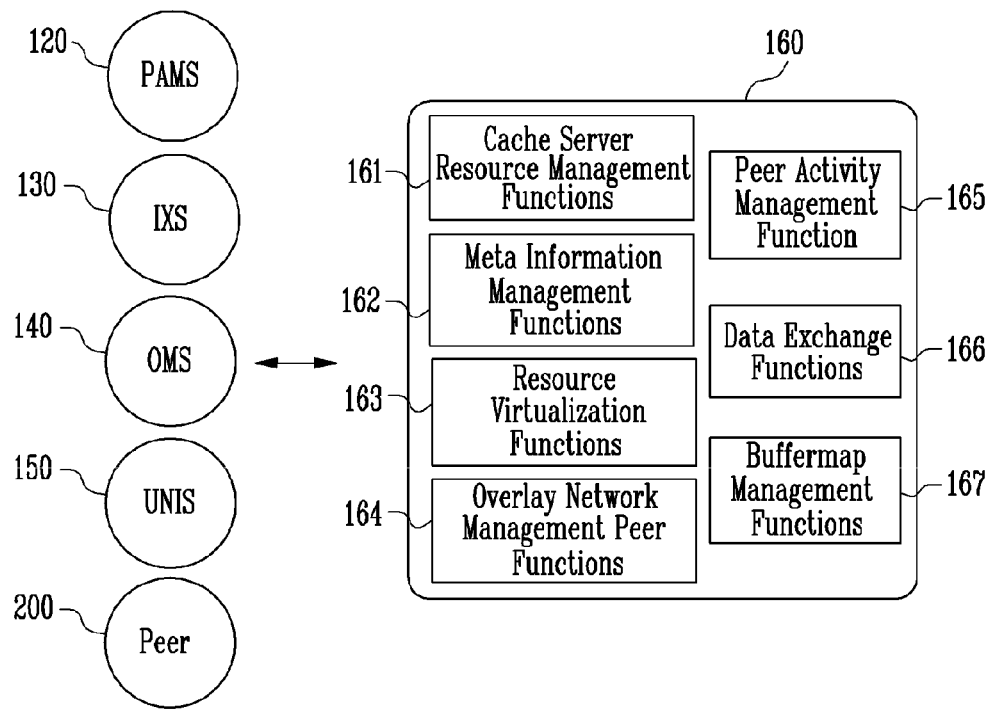
FIG. 9 is a diagram illustrating interoperation relationships between a cache server and related entities in a peer-to-peer network system according to an exemplary embodiment of the present invention.

FIG. 9 is a diagram illustrating interoperation relationships between a cache server and related entities in a peer-to-peer network system according to an exemplary embodiment of the present invention. Referring to FIG. 9, the cache server 160 may include cache server resource management functions 161, meta information management functions 162, resource virtualization functions 163, overlay network management peer functions 164, peer activity management functions 165, data exchange functions 166 and buffermap management functions 167.

The cache server 160 may act as a proxy in distributing or downloading content for a peer.

The cache server 160 may act as a proxy in distributing content as follows: First, the content provider may request the overlay management server 140 of content to act as a proxy in distributing the content. A request for acting as a proxy in distributing content may be made when an overlay network is generated. Here, a content user may additionally transmit policy information relevant to operations of the cache server 160. The overlay management server 140 may reserve resources of the cache server 160 for distribution of the content and transmit corresponding information to the content provider. The cache server 160 may act as a proxy in distributing the content in such a manner that the content provider transmits the content to the cache server 160 by using the information received from the overlay management server 140. For example, service policy information related to operations of the cache server 160 may be the maximum number of seeders in a network that maintain the resources of the cache server 160. In other words, when the number of seeders in the overlay network exceeds a predetermined number, resources may be revoked since a certain amount of distribution of the content is ensured, and when the number of seeders is less than the predetermined number, the resources may be maintained. The content provider that delegates the distribution of the content may be a peer in the overlay network, or a content providing server or a mobile terminal outside the overlay network.

In addition, the cache server 160 may act as a proxy in downloading the content. The cache server 160 may act as a proxy in downloading the content in a substantially similar manner as distributing the content as described above. However, there is a difference between distributing and downloading the content by proxy regarding interworking between a download delegator, a cache server and a content distributor after resource reservation is completed.

The cache server resource management functions 161 may perform functions such as a resource allocation request and resource control and management of the cache server 160.

The cache server resource management functions 161 may process the resource allocation request received from the overlay management server 140. When the overlay management server 140 makes a resource allocation request, the cache server resource management functions 161 may allocate resources and update resource status information if no error is found in the status of resources. In addition, after the resources are allocated, the cache server resource management functions 161 may transmit policy information about services of resources received from the overlay management server 140 to the resource virtualization functions 163 so that the resource virtualization functions 163 may set profile information as a virtual peer. The cache server resource management functions 161 may interwork with the meta information management functions 162 and request meta information about an overlay network. The meta information management functions 162 may receive the meta information about the corresponding overlay network from the index server 130. This has been described in association with the meta information management functions 220 of the peer. The cache server 160 may join the overlay network by using the meta information of the overlay network.

When the use of resources on the basis of the policy information about a resource service is completed, the resource virtualization functions 163 may report this to the cache server resource management functions 161, and the cache server resource management functions 161 may release the allocated resources and leave the overlay network.

In addition, the cache server resource management functions 161 may inform the overlay management server 140 of resource usage information. The overlay management server 140 may check the current status of the resources in the overlay network on the basis of the resource usage information and respond to requests from peers to use resources.

The cache server resource management functions 161 may manage the status of the resources of the cache server 160, such as the total capacity and usage of storage, network or content. The cache server resource management functions 161 may inform available resources at the request of the overlay management server 140. Since other functions of the cache server resource management functions 161 include operations of the peer resource management functions 210 included in the peer 200, a description thereof is omitted.

In addition, the cache server resource management functions 161 may transmit the resource usage information of the cache server 160 to the overlay management server 140 in order to manage the resource usage information of the cache server 160. The resource usage information may be transmitted to the user profile management server 110.

The meta information management functions 162 may perform all operations of the meta information management functions 220 of the peer.

The meta information management functions 162 may have an inherent function of the cache server 160. As described above, the meta information management functions 162 may receive meta information about a specific overlay network from the index server 130 and allow the cache server 160 to join the corresponding overlay network.

Since other operations of the meta information management functions 162 include the above-described operations of the meta information management functions 220 of the peer, a detailed description thereof is omitted.

The resource virtualization functions 163 may set a peer profile related to various operations of the cache server 160 and manage relevant information. More specifically, since the cache server 160 joins various overlay networks and operates as a content distributor or a recipient at the request of a peer, the cache server 160 may function differently in each overlay network. As a result, the resource virtualization functions 163 may set a peer profile in respect of services to control the operation of the cache server 160.

The resource virtualization functions 163 may perform a function for setting a profile as a peer operating in an overlay network at the request of the cache server resource management functions 161. This function may be substantially the same as operations of the local profile management functions 230 included in the peer.

In addition, the resource virtualization functions 163 may manage information in respect of services as well as the peer profile so as to operate as a peer in an overlay network. For example, the information in respect of services may include service policy information of a service provider in association with the cache server 160's providing and stopping service. In other words, the service provider may specify various conditions associated with starting, ending and operating services through the information in respect of services. For example, when services are to end due to service policy, the resource virtualization functions 163 may inform the cache server resource management functions 161 and make a request to release the resources allocated to the corresponding service.

In other words, through the resource virtualization functions 163, the cache server 160 may manage a virtual peer profile and service policy information while the resources are allocated.

In addition, the resource virtualization functions 163 may be informed when the peer completely receives content. In this case, the resource virtualization functions 163 may update peer profile information and make a request to release the resources if necessary.

The overlay network management peer functions 164 may manage information about the overlay network that the peer is joining and information about peers that the overlay network management peer functions 164 come to know. Since operations of the overlay network management peer functions 164 are substantially the same as those of the network management peer functions 240 of the peer, a description thereof is omitted.

Since operations of the peer activity management functions 165, the data exchange functions 166 and the buffermap management functions 167 that constitute the cache server 160 include operations of the functions constituting the peer, a description thereof is omitted.

Figure 10:
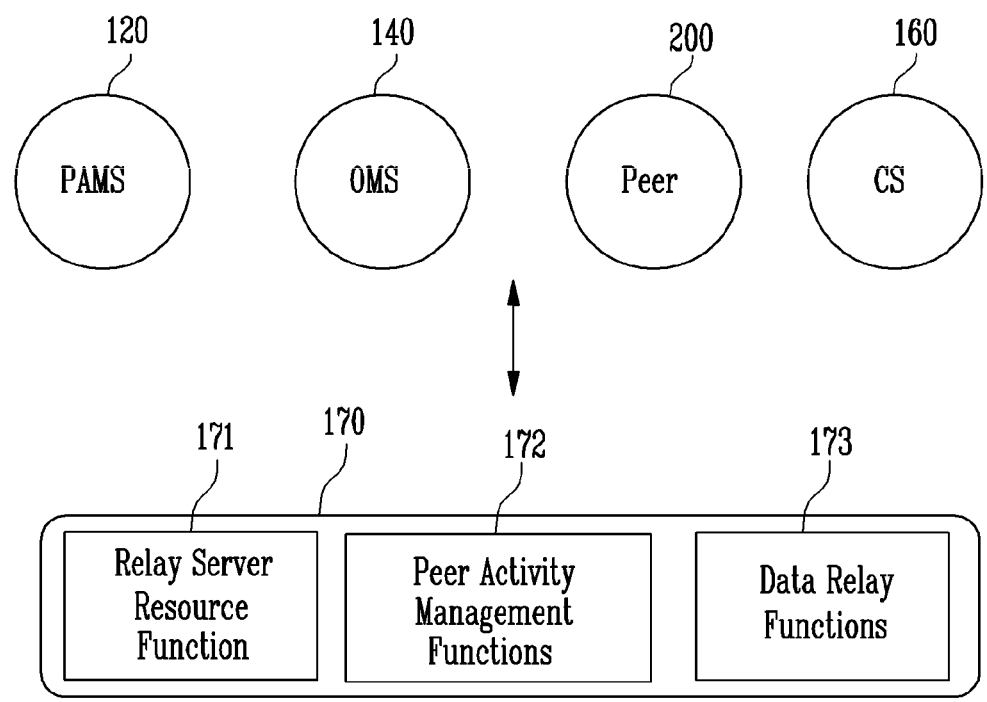
FIG. 10 is a block diagram illustrating interoperation relationships between a relay server and related entities in a peer-to-peer network system according to an exemplary embodiment of the present invention.

FIG. 10 is a block diagram illustrating the configuration of a relay server in a peer-to-peer network system according to an exemplary embodiment of the present invention. Referring to FIG. 10, the relay server 170 may include relay server resource management functions 171, peer activity management functions 172 and data relay functions 173.

The relay server 170 a server that improves a network connection rate and connection quality of a peer, rather than a server that actively joins in a peer-to-peer overlay network. Service may be provided from the relay server 170 by using various methods.

According to a method, when a peer that failed to join a network since the peer is behind a firewall transmits a network join request to the overlay management server 140, the overlay management server 140 may provide the peer with resource information of the corresponding peer and the relay server. In addition, the overlay management server 140 may interwork with the network information management server 150 in order to allocate resources of the relay server 170 having high accessibility to the corresponding peer. After the allocation of the resources is completed, the overlay management server 140 may provide information about the corresponding peer to the relay server 170. The peer may access the relay server 170 and generate transport mapping for data relay. When the peer provided with the resources interworks with another peer, the peer may relay data through the relay server 170. However, the peer may report the peer activity information to the peer activity management server 120 not via the relay server 170.

According to another method, when the relay server 170 includes a function of a peer, a general peer may operate as the relay server 170. First, when the overlay management server 140 provides a peer, which joins a network, with a peer list, the overlay management server 140 may also provide information on whether or not each entity can operate as the relay server 170. If the peer needs relay of the relay server 170 when performing data transmission and reception using a peer protocol, the peer may transmit a message in which an address of a peer that can operate the relay server 170 is included in part of the peer protocol. For example, when an address of a peer functioning as a relay server is written in an INT field of a header of the peer protocol, data may be transmitted to the corresponding peer, and the peer may transmit the data to a destination peer, thereby performing a relay function. In this case, the corresponding peer may report activity information about the peer functioning as the relay server 170 as peer activity information to the peer activity management server 120. In other words, every activity information about a peer functioning as a relay server may be reported as the peer activity information.

In other words, the resources provided by the relay server 170 may be provided by the relay server 170 by control of the overlay management server 140 and according to the status of the resources existing in the overlay network, or may be provided from the peer 200 that can perform a relay function according to selection of peers.

The relay server resource management functions 171 may process a resource allocation request of the relay server 170 at the request of the overlay management server 140 and perform functions for controlling the resources and managing resource information.

The relay server resource management functions 171 may process the resource allocation request received from the overlay management server 140. When the overlay management server 140 requests resource allocation, the relay server resource management functions 171 may check the resource status, allocate the resources if no error is found in the resource status, and update the resource information provided for relay.

The relay server resource management functions 171 may maintain the resource information of the relay server 170, provided by the relay server resource management functions 171 to the overlay network, by managing or updating the resource status such as total size and usage of storage, network or content on the basis of the provision situation.

The relay server resource management functions 171 may manage the resource usage information of the relay server 170. The resource usage information may be transmitted to the overlay management server 140 and then transmitted to the user profile management server 110.

Since the function of the relay server resource management functions 171 includes the operations of the peer resource management functions 210 provided in the peer 200, a description thereof is omitted.

In other words, according to an exemplary embodiment of the present invention, since the relay server 170 relays content to a specific peer joining an overlay network at a resource allocation request of the overlay management server 140 and updates or maintains the resource information provided for relay, a network connection rate and connection quality of the peer may be improved.

The peer activity management functions 172 are functions for sharing data between peers. The peer activity management functions 172 may exchange a buffermap in advance and request a fragment in order to share data between peers and may include a peer protocol. The peer activity management functions 172 of the relay server 170 may perform a relay function by using only part of the peer protocol, for example, SRC, DST and INT fields in a message header during inter-peer communications. As described above, when the peer operates as the relay server 170, the peer as the relay server 170 may relay content to a destination peer with reference to the header message of the peer protocol.

Since other functions of the peer activity management functions 172 include operations performed by the peer activity management functions 250 of the peer, a description thereof is omitted.

The data relay functions 173 may relay data between peers under the control of the peer activity management functions 172.

As set forth above, a peer-to-peer network system according to an exemplary embodiment of the present invention is described. The scope of the invention should not be construed as limited to the embodiments set forth herein, and may be added or modified. In addition, the scope of the invention should not be construed as limited to an operation and a name of a server and an operation and a name of functions constituting the server exemplified in the present specification. A server and functions constituting the server may be added, deleted or changed according to an exemplary embodiment.

According to the present invention, service quality may be improved by increasing manageable functionality of a peer-to-peer network system providing service.

In the drawings and specification, there have been disclosed typical exemplary embodiments of the invention and, although specific terms are employed, they are used in a generic and descriptive sense only and not for purposes of limitation. As for the scope of the invention, it is to be set forth in the following claims. Therefore, it will be understood by those of ordinary skill in the art that various changes in form and details may be made therein without departing from the spirit and scope of the present invention as defined by the following claims.

What is claimed is:

1. A peer-to-peer network system with manageability, comprising:
   at least one peer; and
   an overlay management server configured to manage at least one peer-to-peer network and at least one supporting resource including a cache server in an overlay network,
   wherein the overlay management server is further configured to:
      generate configuration information for configuration of the peer-to-peer network;
      provide the configuration information to the at least one supporting resource;
      manage resource information of the cache server for the configuration of the peer-to-peer network;
      reserve the at least one supporting resource with respect to the cache server based on the resource information for a peer; and
      based on the reservation, request by a requesting peer the cache server to join the peer-to-peer network on behalf of the requesting peer lacking sufficient resources in order to download or distribute content in place of the requesting peer,
   wherein the peer-to-peer network system provides the at least one peer with information for configuration of the peer-to-peer network to optimize the configuration of the peer-to-peer network by using at least one of information about a status of the at least one peer, information about a status of an underlying network, and information about a user in respect of a service, and
   wherein the peer-to-peer network system allows the service provider to stably provide the service to the at least one peer.

2. The peer-to-peer network system of claim 1, wherein the cache server is configured to:
   based on the reservation of the at least one supporting resource by the requesting peer, manage virtual peer profile information and service policy information corresponding to at least one of service provision and service termination to operate as a peer in the peer-to-peer network on behalf of the requesting peer; and perform as a proxy to download or distribute content shared in the peer-to-peer network on behalf of the requesting peer.

3. The peer-to-peer network system of claim 1, wherein the information about the status of the at least one peer includes at least one of maximum upload/download capacity configuration, load status of the at least one peer, storage status of the at least one peer, behavior policy of the at least one peer, and maximum number of peer connections.

* * * * *